Oct. 8, 1940.                C. W. ROSER                2,217,350
                             TOOL HOLDER
                          Filed Aug. 16, 1938
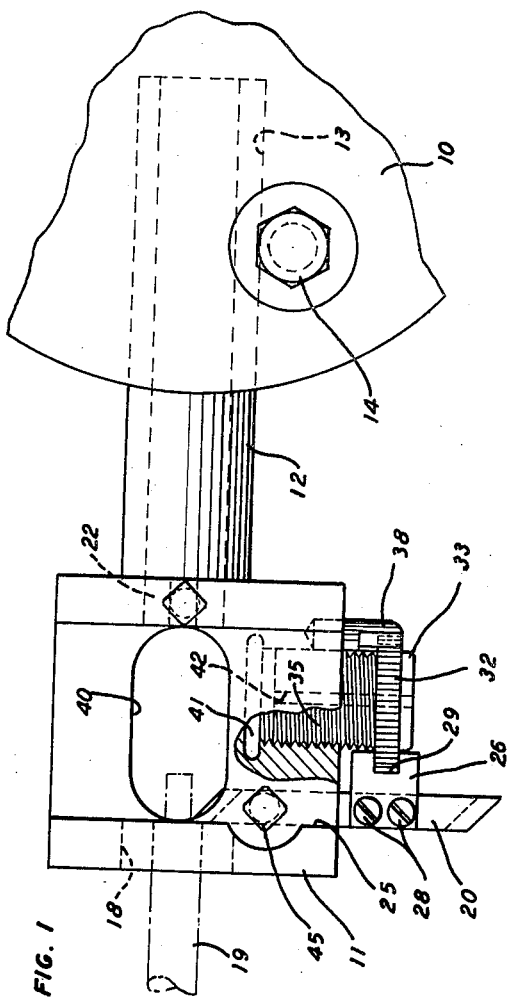
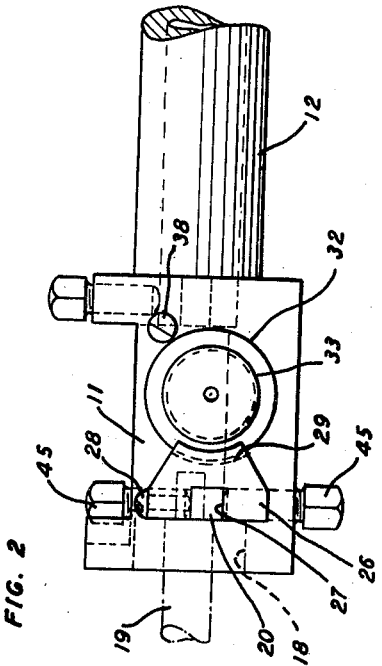
INVENTOR
C.W. ROSER
BY
E.R. Nowlan
ATTORNEY Patented Oct. 8, 1940

2,217,350

UNITED STATES PATENT OFFICE 2,217,350

TOOL HOLDER

Carl W. Roser, Newark, N. J., assignor to Western Electric Company, Incorporated, New York, N. Y., a corporation of New York Application August 16, 1938, Serial No. 225,095

1 Claim. (Cl. 82—35)

This invention relates to tool holders and more particularly to a device to hold and adjustably set a tool relative to the work.

The methods of setting tools, for example, turning tools of automatic machines, frequently include steps of turning the work, with a tool at a selected position, interrupted by intermediate steps of measuring the work and repeating these steps of cutting and measuring until the tool is correctly positioned.

An object of the present invention is to provide a tool holder simple in construction and efficiently operable to accurately position a tool for operation on work.

With these and other objects in view the invention comprises a body apertured to receive a tool movable measured distances relative to the work by an adjusting element, coupled with an indicating means to definitely locate the tool to perform desired operations upon the work.

Other objects and advantages will be apparent from the following detailed description taken in conjunction with the accompanying drawing, wherein Fig. 1 illustrates a top plan view of one embodiment of the present invention, a portion thereof being shown in section, and Fig. 2 is a front elevational view of the tool holder, a portion thereof being broken away.

In the present embodiment of the invention a tool holder is shown associated with an automatic metal working machine of any suitable type, only the tool supporting turret 10 of the latter being shown. The tool holder comprises a body 11 having a hollow shank 12 integral with one side thereof and receivable in an aperture 13 in the turret 10, where it is secured in place by suitable means such as a screw 14. The body 11 is apertured at 18 for receiving work or stock 19 which is to be operated upon by a tool 20. The aperture 18 is in axial alignment with the center line of the hollow shank 12 and with the center line of a bushing 22, the latter being removably secured in an aperture of the body 11 by suitable means, such as a set screw, and provided with a central aperture of a diameter sufficient for the free passage of the reduced stock therethrough. A similar bushing may be provided for the aperture 18 if so desired.

The tool 20 may be of any desired size, type or construction and the body 11 is apertured at 25 to slidably receive a selected tool. A saddle 26 is grooved at 27 in one wall thereof to receive the tool 20, to which it may be secured in a selected location by means of screws 28. Other saddles 26 may be provided with grooves 27 to accommodate tools differing in cross-sectional contour from that shown. The opposite wall of the saddle 26 is also grooved, as at 29, to receive a calibrated rim 32 of a micrometer adjusting screw 33.

The inner portion 35 of the adjusting screw is threaded, the threads being of a definite number per inch and corresponding to the spaces between the graduations upon the calibrated rim so that the rotation of the adjusting screw the distance of one graduation in either direction will cause movement of the screw a definite distance. For example, the adjusting screw may be provided with forty threads to the inch and the calibrated rim may be provided with twenty-five lines equally spaced, resulting in a known movement of the screw one thousandth of an inch for each graduation. A fixed pointer 38 carried by the body 11, as shown in Fig. 1, has a flattened surface providing an indicating edge disposed in close proximity to the calibrated rim 32 to facilitate accurate adjustment.

It will be noted by viewing Fig. 1 that the threaded aperture in the body 11 for the threaded portion 35 of the adjusting screw does not extend through the body to an elongated aperture 40 therein but terminates a short distance therefrom to prevent metal shavings, or other matter, from entering the aperture and interfering with the operation of the screw. A recess 41, however, is formed in the body 11 at the inner end of the threaded aperture, serving as an air pocket communicating with an air passageway 42 extending axially through the adjusting screw to eliminate sealing of air therein which might tend to interfere with the operation of the adjusting screw.

In setting the tool 20 for operation upon the stock 19 let it be assumed, for the purpose of illustration, that a ten thousandth of an inch cut is to be made upon the stock, or in other words, the stock is to be reduced in diameter twenty thousandths to an inch. The operator first secures the saddle 26 upon the tool at a selected position, for example, with the cutting edge in engagement with the stock. The body 11 and/or the stock 19 may be moved relative to each other to allow movement of the tool toward the axis of the stock. The operator then turns the adjusting screw the distance of ten graduations clockwise relative to the pointer 38 and during such moment the tool, through the intermediate association of the saddle with the adjusting screw, has been moved inwardly ten thousandths of an inch. A set screw 45 threadedly carried by the body 11 may be rotated to lock the tool in adjusted position. In this manner the tool may be adjusted to accurately remove material of a definite thickness from the stock and if the stock is of a definite thickness or of a definite diameter throughout, work of a definite diameter may be produced, by adjusting the tool in the manner described.

However, instances may arise when the stock is not of an accurate constant dimension throughout its length or when the stock is of irregular outer dimensions, due to corrosion or the presence of other substances thereon. With stock of this type, an accurate adjustment may be had by positioning the tool to remove a desired portion of the outer surface of the stock for a selected distance, measuring the turned or reduced portion of the stock, and making the necessary adjustment of the tool to position it to make the desired cut. For example, if the portion of the stock, after the outer surface thereof has been removed, measures .428 inch and it is desired to turn the stock to a dimension of .400, the operator makes the adjustment from the position the tool was in at the time of the first cutting operation by rotating the adjusting screw clockwise the distance of fourteen graduations, after which the tool is locked in place by means of the screw 45.

It is preferred in actual construction that the surfaces of the saddle 26 which engage the rim 32 of the adjusting screw and the engaging surfaces of the rim be hardened to eliminate wear. However, there may be sufficient play between these engaging surfaces to permit free movement of one part relative to the other without affecting the accurate adjustment of the tool. For example, if the tool is to be moved inwardly six thousandths of an inch the tool remains locked in the body by the screw 45 while the operator rotates the adjusting screw to bring the inner surface of the rim thereof in close engagement with the adjacent surface of the saddle 26 so that when the tool is free for adjustment the rotation of the adjusting screw clockwise the distance of three graduations will accurately move the tool three thousandths of an inch to reduce the stock a total of six thousandths of an inch in diameter.

Throughout the description of the operation illustrations have been given regarding the adjustment of the tool inwardly. It should be understood that in a similar manner by moving the adjusting screw counterclockwise accurate adjustment may be made of the cutting tool in the opposite direction.

The aperture 40 is formed in the body 11 so that the operator may freely measure the stock when desired. The purpose of the bushing 22 is to support the reduced stock when it is of considerable length to eliminate inaccuracies due to possible bending of the stock, should the reduced stock be unsupported.

The embodiment of the invention herein disclosed has been shown in connection with an automatic machine which is illustrative only and may be widely modified and departed from in many ways without departing from the spirit and scope of the invention as pointed out in and limited solely by the appended claim.

What is claimed is:

A tool holder comprising a body apertured to receive a standard tool movable relative to work, a micrometer tool adjusting element threadedly movable in an aperture in the body and having, in addition to graduations thereon, an annular projecting portion, a saddle conditioned to be removably secured to the tool at selected positions and to straddle the said annular portion to connect the tool to the element for adjustment, and a stationary pointer disposed adjacent the graduations and to cooperate therewith to indicate movement of the tool relative to work.

CARL W. ROSER.